UNITED STATES PATENT OFFICE.

J. HOWELL MEARS, OF PHILADELPHIA, PENNSYLVANIA.

IMPROVEMENT IN PROCESSES OF CHLORINATING ORES.

Specification forming part of Letters Patent No. 195,381, dated September 18, 1877; application filed July 30, 1877.

*To all whom it may concern:*

Be it known that I, J. HOWELL MEARS, M. D., of the city and county of Philadelphia, and State of Pennsylvania, have invented a new and useful Process of Chlorinating Ores, which process is fully set forth in the following specification.

The nature of my invention consists in treating ores by means of chlorine gas evolved within the ore under pressure while in a state of agitation.

In carrying out my invention, I proceed as follows: The ore is properly roasted and pulverized, (the finer the better,) and introduced into a tank, with about one-half its weight of water, into which is slaked a proper proportion of lime, (ordinary lime of commerce,) the whole then being thoroughly incorporated by rotating the tank. Chlorine gas is now introduced into the mass, and the tank kept in motion until no more gas will be absorbed, which can be determined by a suitable device for the purpose. The rotation of the tank is then discontinued, dilute sulphuric acid is added to the mixture, and the tank is again rotated for from half an hour to one hour, when the chlorination is complete.

There is now a large excess of chlorine under pressure, produced by the chlorine gas being evolved by the sulphuric acid from the lime, sulphate of lime being formed and chlorine thrown off. The tank is now tapped, and the excess of chlorine is conducted into a second tank or vessel, similar to the first tank or vessel, and also containing a charge of ore ready to be treated.

After the effervescence has ceased, and almost all of the gas has passed off into the second tank, hot water is introduced into the first tank until the temperature of the mass reaches about 160° or 200°, when all of the free chlorine will have been expelled. The tank is now turned, opened, and emptied into a proper vessel, when the water containing the chloride of gold in solution is drawn off, and the metal precipitated with sulphate of iron or other precipitant.

The tank or vessel that I employ is so constructed that when charged with ore, &c., it will be about two-thirds full, and of sufficient strength to endure a pressure of forty to fifty pounds to the square inch.

The shaft on which the tank revolves will be hollow, so that the chlorine gas may be admitted into the tank while the latter is in motion. The inner face of the tank will be provided with cleats, secured thereto at intervals, so as to facilitate the stirring or agitation of the mass, and with an apartment or receptacle for sulphuric acid located near the top or vent of the tank, whereby, when the latter is turned, it will empty the contents of the apartment or receptacle into the mass of ore.

By this method of subjecting ore to chlorine in connection with lime I am enabled to charge the ore with a very large volume of chlorine, which is condensed by absorption by the lime, and held in store, as it were, until the proper time, when it is again evolved under circumstances most suitable for combining with the gold.

By the evolution of chlorine gas within the mass of ore, while in a state of agitation, in such quantities and under circumstances to produce pressure, the combination of the gold and chlorine takes place with almost as much activity as it does in nitro-muriatic acid.

By having the chlorine gas in large excess, and under the pressure produced, gold will be taken up of a coarser grade than ordinarily, and fine gold is instantly combined. The process is complete in one to two hours, thus saving seven to eight hours in introducing chlorine into the ore, and also the time allowed for the gas to remain in the ore—twenty-four to forty-eight hours before chlorination is said to be complete by the usual processes of chlorination. In from one to three hours all coarse gold will be combined that is not dissolved by the ordinary processes of chlorination.

Having thus described my invention, what I claim as new, and desire to secure by Letters Patent, is—

In treating ores, the process of chlorination, consisting in mixing the ore with lime and water in air-tight tanks, introducing chlorine gas thereinto while in a state of agitation, then adding acid, and again agitating the mass, whereby chlorine gas is evolved in the mass of ore under pressure, substantially as and for the purpose set forth.

J. H. MEARS.

Witnesses:
JOHN A. WIEDERSHEIM,
JNO. A. BELL.